UNITED STATES PATENT OFFICE.

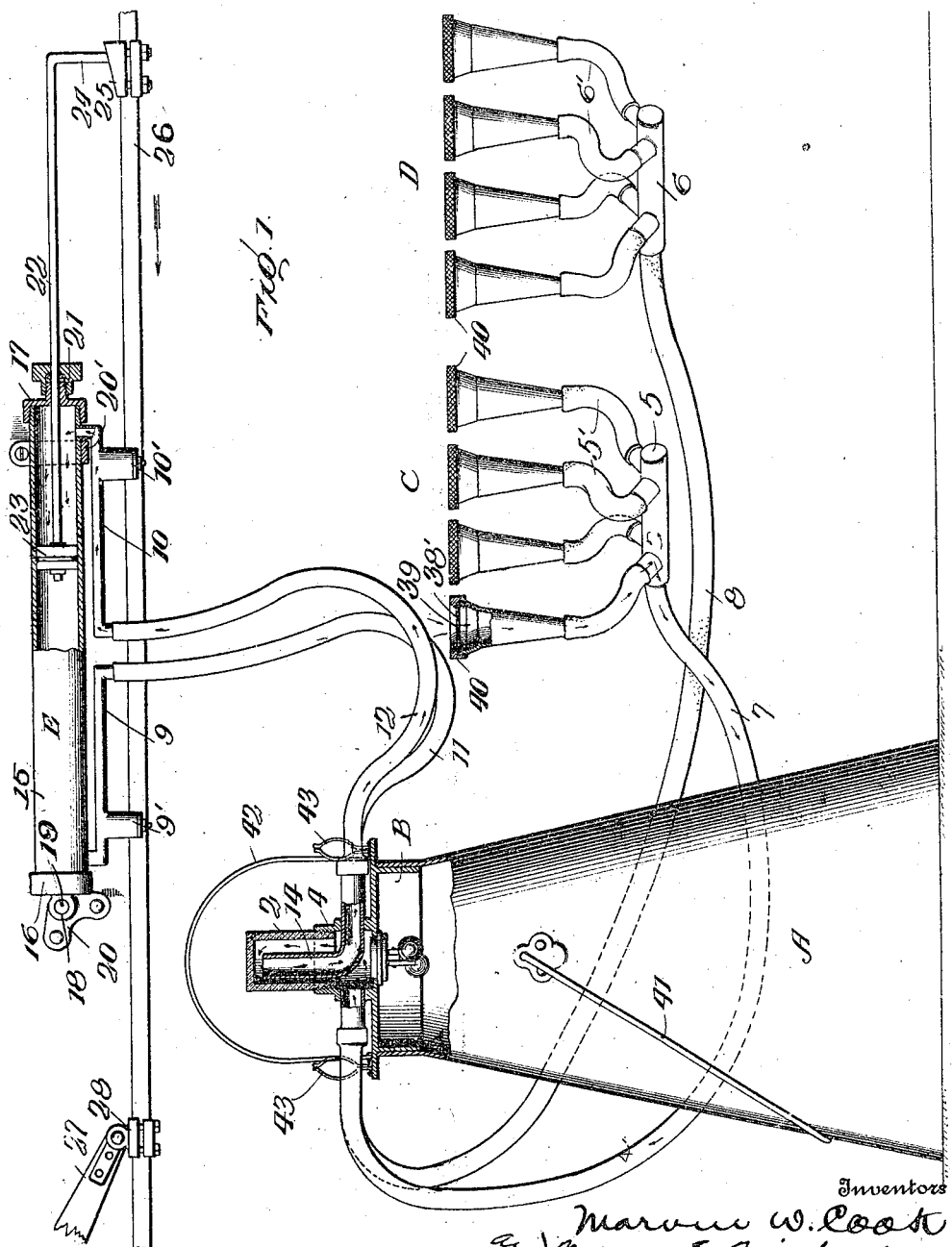

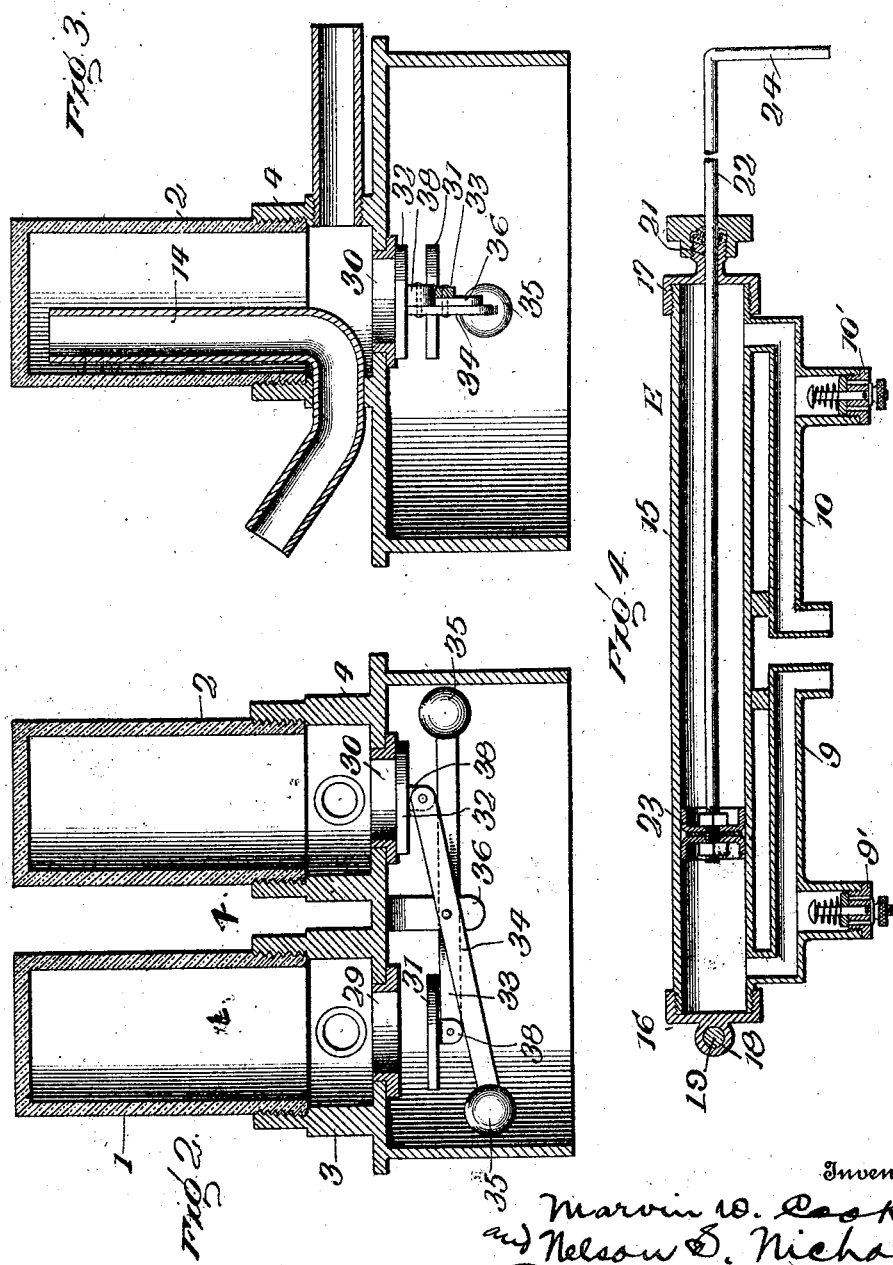

MARVIN W. COOK AND NELSON S. NICHOLS, OF CATTARAUGUS, NEW YORK.

MILKING-MACHINE.

1,217,857.     Specification of Letters Patent.     Patented Feb. 27, 1917.

Application filed January 24, 1916. Serial No. 73,936.

*To all whom it may concern:*

Be it known that we, MARVIN W. COOK and NELSON S. NICHOLS, citizens of the United States, residing at Cattaraugus, in the county of Cattaraugus and State of New York, have invented certain new and useful Improvements in Milking-Machines, of which the following is a specification.

This invention relates to that class of milking machines in which an intermittent or pulsating suction action is applied to the teat cups, by means of a pulsating mechanism which is connected with the milk receiving vessel.

The object of our invention is to produce such a device which is positively operated by mechanical mechanism, and in which the mechanical operating mechanism is such that it can be readily connected to the milking vessel after the latter has been placed in the desired position for milking.

In the accompanying drawings,

Figure 1 is an elevation showing our milking apparatus with parts in section to clearly show the operation;

Fig. 2 is an enlarged sectional view of the milk receptacles and valves associated therewith;

Fig. 3 is a similar section taken at right angles thereto; and

Fig. 4 is an enlarged sectional view of the pulsator or pump.

A represents the portable milk vessel, or pail, and B represents the pail cover, upon which are mounted two glass milk receptacles 1 and 2, each of which is supported on suitable metal base portions 3 and 4.

C and D represent two sets of teat cups, each of which is connected to one of the connector or manifold couplings 5 and 6 by flexible tubes 5' and 6', which couplings are in turn connected by flexible tubes 7 and 8 to the base portions 3 and 4 leading into the milk receptacles 1 and 2.

E represents a pump or pulsator, the opposite ends of which are connected by channels 9 and 10 and flexible tubes 11 and 12, to the base portions 3 and 4 of the milk receptacles 1 and 2, the tubes leading to comparatively L-shaped tubes 14 and 14, the inner ends of which extend well up into the milk receptacles above the level of the tubes 11 and 12, entering the receptacle from the teat cups. This pulsator preferably consists of a cylinder 15 threaded at both ends and adapted to receive caps 16 and 17, one of which is provided with an orifice 18 adapted to receive a stud 19 projecting horizontally from a bracket 20 secured to the side wall of the barn, while the other end is supported by a bracket 20' partly surrounding the cylinder. The other cap 17 has a somewhat restricted opening 21 through which the piston rod 22 passes, having on its inner end a piston head 23. The outer end of said piston rod is preferably bent downwardly as at 24 and is received in a clamp 25 securely fastened to a shaft 26 to which is imparted a reciprocating motion by a pitman 27 attached thereto by the clamp 28.

At the base of each milk receptacle 1 and 2, openings 29 and 30 are provided which openings lead into the vessel A. Valves 31 and 32 control these openings 29 and 30. These valves are pivotally mounted, upon valve levers 33 and 34, the outer ends of which are provided with balancing weights 35. The valve levers 33 and 34 lie in planes parallel to each other, their outer ends extending in opposite directions and crossing each other, scissors fashion, and are pivotally supported at their intersection by a stud 36 extending downwardly from the cover B of the main vessel. The lower portion of each valve is provided with a projection 38 which protrudes over the valve lever of the opposite valve, and is adapted to press down on the opposite valve lever to insure the closing of one valve when the opposite one is opened.

Safety valves 9' and 10' are arranged at the outer ends of the channels 9 and 10 which act to insure an even vacuum.

The teat cups are of the usual funnel shaped form being provided at their outer free ends with rubber mouth pieces or disks 38' provided with orifices 39 and attached thereto by screw caps 40.

When milking hard or slow milkers, a connector or manifold having connections for two teat cups only is used on each of the main tubes 7 and 8, thereby doubling the power.

It is obvious that the cups might be provided with valves wheref two or more might be cut out.

The numeral 41 indicates the bail of the main milk vessel, and 42 indicates the bail of the cover B, permitting of easy handling of both articles; spring supports 43 are provided on the cover B for holding the teat cups when not in use.

The operation is as follows:

As shown in Fig. 1, the piston 23 is moving inwardly in the cylinder, and is drawing into the milk receptacle 2, a charge of milk. When the piston starts on its outer stroke, the partial vacuum is relieved in the milk receptacle 2, and a slight pressure is exerted within said milk receptacle 2, which together with the weight of the contents therein cause the valve 32 to open, permitting the milk to pass into the main milk receptacle. With the opening of valve 32, valve 31 is mechanically closed by the action of valve 32, in which position it remains, due to the partial vacuum caused in the milk receptacle 1 by the outer stroke of piston 23. Milk is now drawn into the milk receptacle 1 through tube 8 from which receptacle it is discharged in the manner described when the piston 23 returns on its inner stroke.

It is obvious that many slight changes might be made within the scope of our invention and hence we do not wish to be limited to the precise structure set forth, but:—

We claim:

1. The combination of a milk vessel, a cover, milk receptacles arranged thereon, teat-cups connected with the milk receptacles, valves controlling ports connecting the milk receptacles and milk vessels, said valves mounted on the under side of the cover and within the milk vessel in such a manner as to open and close the respective ports, said milk receptacles adapted to be connected to a pump.

2. The combination of a milk vessel, with receptacles associated therewith, teat cups connected with the milk receptacles, valves controlling ports connecting the milk receptacles and the milk vessels, valve levers supporting said valves which are pivotally mounted upon the valve levers which lie in planes parallel to each other, their outer ends extending in opposite directions and crossing each other and pivotally supported at their intersection, projections extending downwardly from each valve over the valve lever of the opposite valve whereby the valves are simultaneously opened and closed.

3. The combination of a milk vessel, with receptacles associated therewith, teat cups connected with the milk receptacles, valves controlling ports connecting the milk receptacles and the milk vessels, valve levers supporting said valves which are pivotally mounted upon the valve levers which lie in planes parallel to each other their outer ends extending in opposite directions and crossing each other and pivotally supported at their intersection, projections extending downwardly from each valve over the valve lever of the opposite valve whereby the valves are simultaneously opened and closed, and means for alternately causing a partial vacuum in each milk receptacle when its valve is closed and flushing the latter when its valve is opened.

4. The combination of a milk vessel, transparent milk receptacles vertically mounted on the exterior thereof, teat cups, ducts leading therefrom to the base of the transparent receptacles, L shaped tubes leading well up into the exterior of the transparent receptacles and adapted to be connected with a pump whereby when suction is applied the contents drawn from the teats will collect within the transparent milk receptacles.

5. The combination of a milk vessel, transparent milk receptacles vertically mounted on the exterior thereof, teat cups, ducts leading therefrom to the base of the transparent receptacles, L shaped tubes leading well up into the exterior of the transparent receptacles and adapted to be connected to a pump whereby when suction is applied the contents drawn from the teats will collect within the transparent milk receptacles, valves controlling ports connecting the milk receptacles and the milk vessels, said valves so arranged as to open and close upon the actuation of the pump.

In testimony whereof we affix our signatures.

MARVIN W. COOK.
NELSON S. NICHOLS.